United States Patent
Onghai

(10) Patent No.: US 8,747,118 B2
(45) Date of Patent: *Jun. 10, 2014

(54) AUTOMATIC VOTING AMONG SMALL SUBSETS OF CONTESTANTS

(71) Applicant: Michael Go Onghai, New York, NY (US)

(72) Inventor: Michael Go Onghai, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/970,301

(22) Filed: Aug. 19, 2013

(65) Prior Publication Data

US 2013/0337426 A1     Dec. 19, 2013

Related U.S. Application Data

(63) Continuation of application No. 12/008,809, filed on Jan. 14, 2008, now Pat. No. 8,512,046.

(51) Int. Cl.
*G09B 9/00* (2006.01)
*G09B 19/00* (2006.01)

(52) U.S. Cl.
USPC ..................................... 434/306

(58) Field of Classification Search
USPC .................... 434/350, 306; 705/12
See application file for complete search history.

(56) References Cited

U.S. PATENT DOCUMENTS

| | | | |
|---|---|---|---|
| 5,916,024 A | 6/1999 | Von Kohorn | 463/40 |
| 7,076,434 B1 | 7/2006 | Newnam et al. | 705/1 |
| 7,162,433 B1 | 1/2007 | Foroutan | 705/11 |
| 7,258,275 B1 | 8/2007 | Reddy | 235/384 |
| 2009/0024457 A1 | 1/2009 | Foroutan | 705/12 |
| 2009/0181355 A1 | 7/2009 | Onghai | 434/362 |

*Primary Examiner* — Kesha Frisby
(74) *Attorney, Agent, or Firm* — Pillsbury Winthrop Shaw Pittman LLP

(57) ABSTRACT

A method of surveying a population of voters concerning a pool of contestants to obtain a consensus comprises generating a digital list of all possible pairs, triplets or quadruplets of contestants in the pool and/or sublist of such small subsets of contestants in a subpool such as a social network, presenting to voters in the population at a web site each small subset of contestants in the digital list and/or digital sublist, and for each small subset of contestants presented prompting the voter to select a preferred contestant among the contestants that appear in the small subset of contestants. The voters may also be contestants. A tally of preferred contestants among all voters is assembled as is a tally among contestants from the subpool, and contestants may be ranked. The voting may be applied to costume contests, pet contests, political elections, market surveys and other data collection methods.

16 Claims, 1 Drawing Sheet

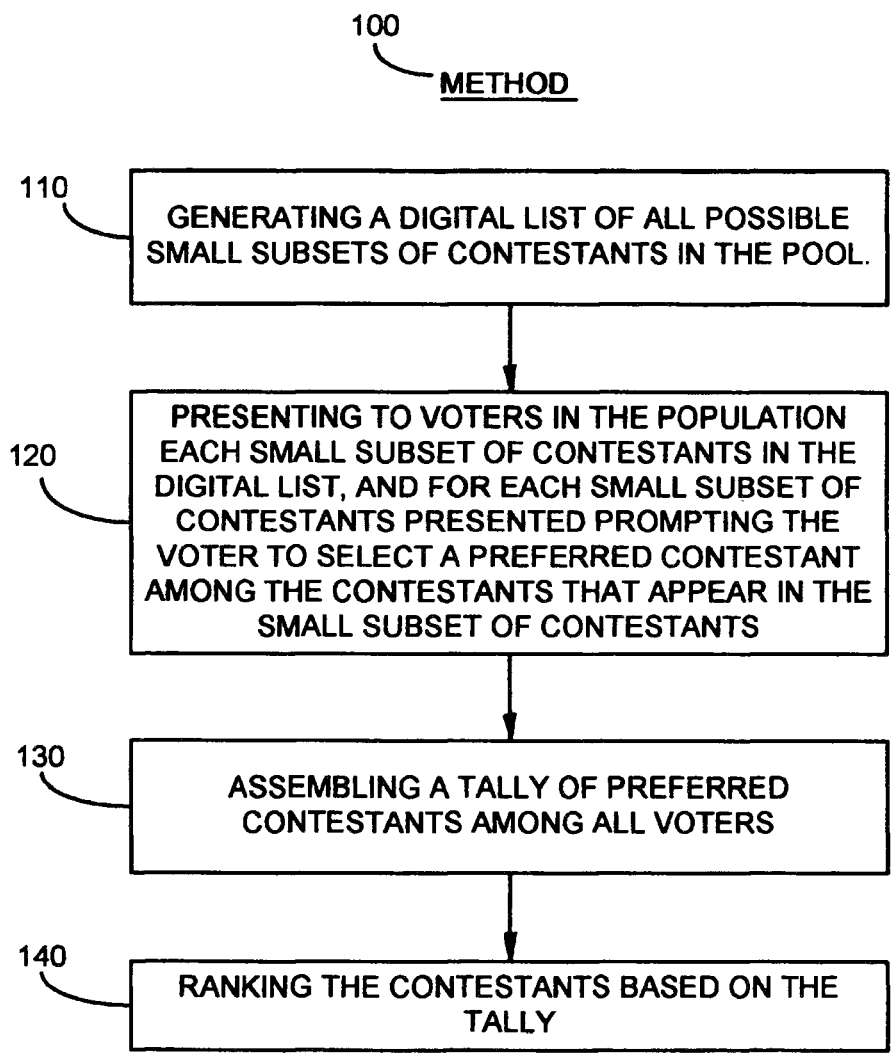

AUTOMATIC VOTING AMONG SMALL SUBSETS OF CONTESTANTS

CROSS-REFERENCE TO RELATED APPLICATIONS

This Application is a continuation of U.S. patent application Ser. No. 12/008,809 filed Jan. 14, 2008, now pending, the entire contents of which are hereby incorporated by reference.

BACKGROUND OF THE INVENTION

The present invention generally relates to apparatus and methods for collecting voting or opinion data such as by market survey or political ballot and, more particularly, to apparatus and methods of automatically collecting consensus voting data from a pool of voters presented with two, three or four contestants.

Typically, the traditional method of collecting consensus data is to use polls to do market surveys or ballots to conduct political or other contests through the use of questionnaire and surveys that are done predominantly by intrusive methods such as telemarketing or focus groups and less effective ways such as mailings. However, this process requires a delivery and data collection system that is cumbersome and not cost effective. As a result the validity and generalization of the results may be adversely affected by events such as low response rate, limited financial and human resources, and the like. Further, the traditional method lacks the flexibility to accommodate the fast changing dynamics of an interactive world.

In addition, psychological studies show that short term memory (the capacity to hold in mind in an active highly available state a small amount of information such as 5 to 9 words or other elements) holds a small amount of information for only about 20 seconds. Voters therefore do not necessarily remember all candidates at the same time when selecting a single winner. Thus, our human limitations may inadvertently yield inaccurate results using traditional methods.

Nevertheless, it is very important and useful to collect consensus data from large amounts of people for the valuable information it may yield. Moreover, there is a need to collect data on the consensus of a pool of voters that maximizes the insight and analysis that can flow from such data and there is a need to collect such data in a more efficient, systematic and dynamic manner. There is also a need to have a data collection/voter system that is also suitable for a contest where most of the entrants are also voters, e.g. a fashion show, a dog show, a costume contest, where each contestant uploads their entry and also votes as in a presidential election.

SUMMARY OF THE PRESENT INVENTION

In one aspect of the present invention, there is presented a method of surveying a population of voters concerning a pool of contestants, comprising: generating a digital list of all possible small subsets of contestants in the pool; presenting to voters in the population each small subset of contestants in the digital list, and for each small subset of contestants presented prompting the voter to select a preferred contestant among the contestants that appear in the small subset of contestants; assembling a tally of preferred contestants among all voters; and ranking the contestants based on the tally.

In a further aspect of the invention, there is presented a method of surveying a population of voters concerning a pool of contestants, comprising: generating a digital list of all possible small subsets of contestants in the pool; updating the digital list as new contestants enter the pool, prompting voters in the population to access at a web site each small subset of contestants in the list, one small subset at a time, based on an order that favors those small subsets that include a particular contestant that appears in the fewest small subsets that have already been voted on, and, for each small subset of contestants accessed, prompting each voter to select a preferred contestant among the contestants that appear in the small subset of contestants; and assembling a tally of preferred contestants among all voters in a manner that prevents a voter from voting on the same small subset more than once.

In another aspect of the invention, there is presented a method of surveying a population of voters, comprising: generating a digital list of all possible small subsets of contestants in a pool of contestants; generating a digital sublist of all possible small subsets of contestants in a subpool of the pool; updating the digital list and digital sublist as new contestants enter the pool and/or the subpool; prompting voters in the population to access at a web site each small subset of contestants in a digital list, and, for each small subset of contestants accessed, prompting each voter to select a preferred contestant among the contestants that appear in the small subset of contestants from the digital list; prompting voters in the population to access at a web site each small subset of contestants in a sublist, and, for each small subset of contestants accessed, prompting each voter to select a preferred contestant among the contestants that appear in the small subset of contestants from the digital sublist; and assembling a tally of preferred contestants among all contestants in the digital list and assembling a tally of preferred contestants among all contestants in the digital sublist.

In a further aspect of the presented, a method of operating a contest, comprises allowing entry of contestants to form a pool of contestants; generating a digital list of all possible small subsets of contestants in the pool; generating a digital sublist of all possible small subsets of contestants in a subpool of the pool; updating the digital list and digital sublist as new contestants enter the pool; prompting voters in the population to access at a web site each small subset of contestants in a digital list, and, for each small subset of contestants accessed, prompting each voter to select a preferred contestant among the contestants that appear in the small subset of contestants from the digital list; prompting voters in the population to access at a web site each small subset of contestants in a sublist, and, for each small subset of contestants accessed, prompting each voter to select a preferred contestant among the contestants that appear in the small subset of contestants from the digital sublist; and assembling a tally of preferred contestants among all contestants in the digital list and assembling a tally of preferred contestants among all contestants in the digital sublist.

These and other features, aspects and advantages of the present invention will become better understood with reference to the following drawings, descriptions and claims.

BRIEF DESCRIPTION OF THE DRAWINGS

FIG. 1 is a flow chart showing a method of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method of polling large pools of voters that may provide insights and analysis concerning the consensus of opinion of the pool. The method may be applicable to any kind of data collection. For example, the method may be applicable to political polling and market surveys where the purpose may be obtain insight into the respective popularity of candidates on various issues or in general. The method may also be used for selecting a consensus "winner" in a contest where voters can also enter the contest over time, such as a costume contest. In either case, the method may present all voters with a small subset of contestants to choose from, prompting them to show among the candidates in the small subset. The method then tallies data that may be obtained by voters who make the selections at a web site.

In contrast to the prior art, in which contests are tallied in a labor intensive manner, the method of the present invention conducts and tallies contests automatically. In further contrast to the prior art, in which surveys and contests are measured with respect to a tally of votes among all or most of the contestants, the method of the prior art presents voters with a small combinations or subset of contestants, such as pairs, combinations of three contestants or combinations of four contestants. In still further contrast to the prior art: where lists of contestants are presented to voters in a rigid or static manner, the method of the present invention may be applicable both to contests in which there is a fixed number of contestants and to contests in which the number of contestants changes over time. In keeping with that, the method of the present invention may automatically present to voters small subsets of contestants in an order that favors those small subsets that have been least voted on and/or that favors those small subsets that include a particular contestant that appears in the fewest small subsets that have already been voted on. The method of the present invention may also present to voters small subsets of contestants in a manner that prevents a voter from voting on the same small subset more than once.

In this regard, the term "small subsets" of contestants shall refers to combinations of two contestants (pairs), combinations of three contestants (triplets of contestants) or combinations of four contestants (quadruplets of contestants). The term "vote" or "voting" also encompasses selection of a preference or a statement of an opinion on a topic. The term "contestants" as used in this patent application shall be understood to be a broad term that refers not only to human or animal contestants but also to inanimate objects/items.

As can be seen from FIG. 1, which is a flow chart, the present invention envisions a method 100 of surveying a population of voters concerning a pool of contestants. Method 100 may include a step 110 of generating a digital list of all possible small subsets of contestants in the pool. The digital list may be generated based on the known set of contestants in the pool. For example, if there are eight known contestants to a political competition, the digital list may be comprised of every two, three or four person subset of the eight contestants. In the case of subset pairs, that would mean 8 times 7 (=56) divided by 2 (to eliminate duplication since the order of contestants within a pair is irrelevant), or 28 small pairs of contestants. Likewise, in the case of subset triplets, that would mean 8 times 7 times 6 (=336) divided by 6, or 56 small pairs of contestants. In the case of subsets having four contestants, that would mean 8 times 7 times 6 times 5 (=1680) divided by 24, or 70 small pairs of contestants.

The contestants may become known to a computer system operating an algorithm at a web site by virtue of each contestant entering the contest at the web site. The contestants may also be known to the computer system in advance of the vote. That is because the digital list of known contestants may be fixed and finite or, in certain embodiments, may vary over time. For example, the method of the present invention may be applicable not only to surveying voters in a political contest but it may be used to survey voters in a contest where both voters and entrants participate interactively at a web site. For example, if the pool of contestants is for best costume among whoever happens to enter the contest and the contest is open over a time period, some of the voting may take place before all the contestants have entered. The method 100 may function as a human interface tool, allowing each participant to join either by submitting an entry to the contest or by casting a vote in the contest or by doing both.

Method 100 may also include a step 120 of presenting to all the voters in the population each small subset of contestants in the list, and for each small subset of contestants presented, prompting the voter to select a preferred contestant among the contestants that appear in the small subset of contestants. This is part of the data collection stage. For example, a participant at a web site may be presented with each small subset one at a time and asked to vote for a single contestant within the small subset (pair, triplet or quadruplet) of contestants. The algorithm operating the web site that is interacting with the voters using the method of the present invention may dictate that the voter can only vote one time for a given small subset of contestants.

Of course, the type of small subset (whether two, three or four) may remain consistent throughout the contest. That is, all voters may be presented with small subsets having the same numbers of contestants.

It may very well be the case empirically that when using the method of the present invention not all voters will respond to all prompts and actually vote on all small subsets of contestants presented to them. This may lead to imbalances between small subsets or between contestants. For example, imbalances may occur in that certain pairs of contestants (or three or four contestant small subsets) may be voted on more than others. This can be caused by some people voting on certain pairs and not others. This imbalance may be corrected by the algorithm operating the interactive web site in accordance with the method of the present invention as follows. Initially, every small subset may be assigned the number zero as the number of times that this small subset of contestants has been presented to a voter and that voter has made a selection choosing one of the contestants of that small subset. Since all pairs are initially equal in this respect, the algorithm may randomly select a first small subset to be presented to a voter. Once that small subset has been voted on, the remaining small subsets are equal and one of these remaining small subsets may then be randomly selected as the next small subset to be presented to the voter and voted on. In this way, the algorithm may keep a record of that small subset that is least voted on as of a given time. The algorithm may then automatically always present that least-voted on small subset next to be voted on. This feature, in certain contexts referred to as the least total voted pair (LTVP), is designed to correct the imbalance that arises if certain pairs of contestants (or three or four contestant small subsets) may be voted on more than others. According to this feature, the method 100 includes presenting the small subsets of contestants in an order that favors those small subsets that have been least voted on.

The method 100 also contemplates other ways of implementing the least total voted pair feature. Instead of the algorithm automatically always presenting the least-voted-on small subset as the next small subset to be voted on, the algorithm may instead merely favor such least-voted-on small subset in a probabilistic sense. For example, if pair A has so far been voted on 5 times, pair B has so far been voted on 4 times and pair C has so far been voted on 3 times, pair C may not automatically be presented next. Rather, pair C may be more likely to be presented next.

In this regard, the present invention contemplates many ways of identifying how to assign probability to favor the least voted-on pair. For example, after each vote, a favorability adjustment factor may be assigned for each pair relative to whatever expected probability of being presented next it otherwise had. An example of the favorability adjustment factor may be a ratio of the actual number of times the pair has been voted on to the expected number of times that pair has been voted on. The algorithm may implement this favorability adjustment factor by simulating a selection of possible pairs out of a pool of pairs (i.e. a "digital hat" that the computer picks pairs out of) and then skew the results in favor of a particular pair by adding "copies" of the favored pair to the "digital hat". The number of added copies may be proportional to the favorability adjustment factor. The result may be that the least frequently shown will have highest probability of being presented next.

A second imbalance that may occur is if one (or some) of the contestants is overrepresented in being voted on. For example, if during the contest voters are tending to vote for small subsets in which a particular contestant appears because that contestant arouses much passion, for example. Another reason this second imbalance may occur is due to the algorithm correcting the first imbalance by serving up a least voted on small subset to voters. This imbalance is not focused on which small subset is least voted on but on which individual contestant is least voted on.

Accordingly, if a particular contestant appears in too many small subsets, that contestant will be disfavored. This may occur because the algorithm keeps tabs on the contestant who appears in the fewest small subsets that have been voted on and presents to the voter as the next small subset the small subset in which that contestant appears. If, for example, a candidate entered late in the contest and for this reasons appears in all the least voted on small subsets and as a result small subsets in which he appears receives priority/favor in being presented to voters, this could cause boredom.

Accordingly, method 100 may also include a feature presenting the small subsets of contestants in an order that favors those small subsets that include a particular contestant that appears in the fewest small subsets that have already been voted on. As with the "least voted pair imbalance", the algorithm may merely favor those small subsets that include a particular contestant appearing in the fewest small subsets that have already been voted on, or the algorithm may be programmed to always automatically serve up as the next small subset the one that includes a particular contestant appearing in the fewest small subsets already voted on. In this regard, the term "favor" has its ordinary meaning which means to at least favor, i.e. to merely favor or to completely prefer (the extreme case of favoring).

The responses to the prompts to vote are collected automatically, such as by computer. Method 100 may further include a step 130 of tallying up the data by assembling a tally of preferred contestants among all voters. In certain cases, step 130 may involve tallying up the data of preferred candidates only among a subpool of all voters in the pool. The statistical analysis of the data responses may come after the responses have been collected at the end of a designated period of data collection or competition, for instance.

Method 100 may also include a step 140 of ranking the contestants based on the tally based on who has the most votes overall. It can be appreciated that the winner of a political contest in which the votes of contestant pairs (or small subsets of three or four contestants) are tallied may be different than the winner of the contest when all contestants are presented at once. In the case of the method 100 the winner may be more likely to be a true consensus candidate.

Thus the present invention may apply to contests that accept contestants on a rolling basis until a certain date and then extend the voting until another date. The voting can start before all the contestants have been entered and can correct imbalances occurring due to that fact. Over time, the contestants may have fairly equal number of chances to be presented to the voters in the pairs to be selected.

In any of the embodiments of the method of the present invention, a participant may be allowed at least nine possible participation options. They include the following: a participant may choose to enter the contest and not vote in the contest. The participant can do so by submitting his/her own entry in response to the specific topic (e.g., best fashion designer) and decide to limit the entry to his/her own social network only (e.g., friends identified by the participant) or the participant may decide to include his/her entry in the entire pool of items or the participant may decide to do both.

The participant may also skip the submission of an entry entirely and elect only to vote. Thus the participant may cast his/her vote for the best designer from his social network's entry or the best designed for the entire pool of entries or separately vote both for the best designer for the entire pool and for the best designer for his social network.

Finally, the participant can submit his/her own entry in the manner described in the first three options and also cast his/her vote as described in the second three options.

The social network, which forms a subpool of voters and from which a digital sublist of small subsets of contestants is formed, may be defined by the system operating the contest or surveying the population. For example, the social network in the case of costume contest may be limited to only those participants who are of a certain age range, or only those who are from the class of '96. The algorithm at the web site can be programmed to present more than one option as a social network.

The present invention may be viewed as a method 200 of surveying a population of voters concerning contestants within a pool of contestants. Method 200 may include a step 210 of generating a digital list of all possible small subsets of contestants in a pool, small subsets being comprised of two, three or four contestants. Method 200 may also include a step 220 of generating a digital sublist of all possible small subsets of contestants in a subpool of the pool. The subpool may be a social network. Step 230 may include updating the digital list and digital sublist as new contestants enter the pool. Method 200 may further include a step 230 of prompting voters in the population to access at a web site each small subset of contestants in a sublist, one small subset at a time, and, for each small subset of contestants accessed, prompting each voter to select a preferred contestant among the contestants that appear in the small subset of contestants. Finally, method 200 may include a step 240 of assembling a tally of preferred contestants among all voters in a manner that prevents a voter from voting on the same small subset more than once. The sublist may represent a collection of entrants in the list that form a common social network.

The method of the present invention may also involve surveying a population of voters by generating a digital list of all possible small subsets of contestants in a pool of contestants; generating a digital sublist of all possible small subsets of contestants in a subpool of the pool, such as a social network. The method further includes updating the digital list and digital sublist as new contestants enter the pool and/or enter the subpool. The method may also involve prompting voters in the population to access at a web site each small subset of contestants in a digital list, and, for each small subset of contestants accessed, prompting each voter to select a preferred contestant among the contestants that appear in the small subset of contestants from the digital list. The same is done with the sublist and subpool. The method involves prompting voters in the population to access at a web site each small subset of contestants in a sublist, and, for each small subset of contestants accessed, prompting each voter to select a preferred contestant among the contestants that appear in the small subset of contestants from the digital sublist. The method also involves assembling a tally of preferred contestants among all contestants in the digital list and assembling a tally of preferred contestants among all contestants in the digital sublist.

Furthermore, the present invention may also be characterized as a method of operating a contest, comprising allowing entry of contestants to form a pool of contestants; generating a digital list of all possible small subsets of contestants in the pool; generating a digital sublist of all possible small subsets of contestants in a subpool of the pool; updating the digital list and digital sublist as new contestants enter the pool; prompting voters in the population to access at a web site each small subset of contestants in a digital list, and, for each small subset of contestants accessed, prompting each voter to select a preferred contestant among the contestants that appear in the small subset of contestants from the digital list; prompting voters in the population to access at a web site each small subset of contestants in a sublist, and, for each small subset of contestants accessed, prompting each voter to select a preferred contestant among the contestants that appear in the small subset of contestants from the digital sublist; and assembling a tally of preferred contestants among all contestants in the digital list and assembling a tally of preferred contestants among all contestants in the digital sublist. In such a contest, the method may also allow each voter to also enter the contest as a contestant in the pool and/or enter the contest as a contestant in the subpool. The method may also allow each voter to vote among contestants in the pool and/or to vote among contestants in the subpool.

Source Code

The following is an example of one possible source code for an algorithm in one embodiment of the present invention relating to the least total voted pair feature:

```
function next_contest_to_vote($uid) {
    global $DBPREFIX;
    if (!valid_int($uid)) {
        echo "I.D. must be an integer! <p>";
        return 0;
    }
    $qry="select cid from show_tally where deleted=O and cid not in
    (select cid from show_vote where deleted=O and judge=$uid)
    order by totalvotes limit 1";
    if ($DEBUG) echo "qry:$qry";
    $rs=mysql_query($qry);
    $num=mysql_num_rows($rs);
    if ($num) {
        $row=mysql_fetch_row($rs);
        if ($DEBUG==1) print_r($row);
        $cid=$row[0];
        if ($DEBUG) echo "cid = $cid<p>";
        return $cid;
    } else {
        return -1;
    }
}
```

The following is an example of one possible source code for an algorithm in one embodiment of the present invention relating to correcting the imbalance as to which contestant is least voted on:

```
/*
    the following function returns the next pair to display by first
    selecting the contestant who has been paired the least.
*/
function next_contest_to_vote($uid,$item_id) {
    if (!valid_int($uid)) {
        echo "I. D. must be an integer! <p>";
        return 0;
    }
    $qry="select item_id from show_ contestant where deleted=O
    and item_id
in
    (select item1 from show_tally where cid not in
    (select cid from show_ vote where deleted=O and
judge=$uid)) order by totalmatches limit 1";
    $rs=mysql_query($qry);
    $num=mysql_num_rows($rs);
    if (!$num) {
        $qry="select item_id from show_contestant where deleted=O
        and item_id
in
    (select item2 from show_tally where cid not in
    (select cid from show_vote where deleted=O and
judge=$uid)) order by totalmatches limit 1";
        $rs=mysql_query($qry);
        $num=mysql_num_rows($rs);
    }
    if ($num) {
        $row=mysql_fetch row($rs);
        $nextitem_id=$row[0];
    }
    $qry="select cid from show_tally where
    (item1=$nextitem_id or
item2=$nextitem id)
    and deleted=O and cid not in (select cid from show_vote
where deleted=O and judge=$uid)
    order by totalvotes limit 1";
    $rs=mysql_query($qry);
    $num=mysql_num_rows($rs);
    if ($num) {
        $row=mysql_fetch_row($rs);
        $cid=$row[0];
        return $cid;
    } else {
        return -1;
    }
}
```

It should be understood, of course, that the foregoing relates to exemplary embodiments of the invention and that modifications may be made without departing from the spirit and scope of the invention as set forth in the following claims.

I claim:

1. A method of surveying a population of voters concerning a pool of contestants, the method executed by a computer system configured to perform a plurality of operations, the operations comprising:
    generating, using the computer system, a list of subsets of contestants in the pool;

presenting, using the computer system, at least some of the subsets of contestants in the list to at least one of the voters in the population in an order that favors those subsets that have been least voted on; and for each subset of contestants presented, prompting the at least one of the voters to select a preferred contestant among the contestants that appear in the subset of contestants.

2. The method of claim 1, further comprising:

assembling, using the computer system, a tally of preferred contestants selected by the voters; and ranking, using the computer system, the preferred contestants based on the tally.

3. The method of claim 1, wherein the subsets of contestants each have at least two contestants.

4. The method of claim 1, wherein the total number of contestants in the pool changes over time between said prompting a first voter in the population and said prompting a second voter in the population.

5. The method of claim 1, wherein the at least one voter is allowed only one opportunity to select a preferred contestant among the contestants that appear in the subset of contestants.

6. The method of claim 1, wherein said presenting the at least some of the subsets is done one subset at a time.

7. A method of surveying a population of voters concerning a pool of contestants, the method executed by a computer system configured to perform a plurality of operations, the operations comprising:

generating, using the computer system, a list of subsets of contestants in the pool;

presenting, using the computer system, at least some of the subsets of contestants in the list to at least one of the voters in the population in an order that favors those subsets that include a particular contestant that appears in the fewest subsets that have already been voted on; and for each subset of contestants presented, prompting the at least one of the voters to select a preferred contestant among the contestants that appear in the subset of contestants.

8. The method of claim 7, further comprising:

assembling, using the computer system, a tally of preferred contestants selected by the voters; and ranking, using the computer system, the preferred contestants based on the tally.

9. The method of claim 7, wherein the subsets of contestants each have at least two contestants.

10. The method of claim 7, wherein the total number of contestants in the pool changes over time between said prompting a first voter in the population and said prompting a second voter in the population.

11. The method of claim 7, wherein the at least one voter is allowed only one opportunity to select a preferred contestant among the contestants that appear in the subset of contestants.

12. The method of claim 7, wherein said presenting the at least some of the subsets is done one subset at a time.

13. A method of surveying a population of voters concerning a pool of contestants, the method executed by a computer system configured to perform a plurality of operations, the operations comprising:

generating, using the computer system, a list of subsets of contestants in a pool of contestants;

generating, using the computer system, a sublist of subsets of contestants in a subpool of the pool;

updating, using the computer system, the list and sublist as new contestants enter the pool and/or the subpool;

prompting, using the computer system, at least one of the voters in the population to access at a web site at least some of the subsets of contestants in the list, and, for each subset of contestants accessed, prompting the at least one of the voters to select a preferred contestant among the contestants in the subset of contestants from the list, wherein the at least one of the voters is prompted to access the at least some of the contestants subsets in the list in an order that favors those subsets that have been least voted on or in an order that favors those subsets that include a particular contestant that appears in the fewest subsets that have already been voted on;

prompting, using the computer system, at least one of the voters in the population to access at a web site at least some of the subsets of contestants in the sublist, and, for each subset of contestants accessed, prompting the at least one of the voters to select a preferred contestant among the contestants in the subset of contestants from the sublist; and assembling, using the computer system, a tally of preferred contestants among all contestants in the list, and assembling a tally of preferred contestants among all contestants in the sublist.

14. The method of claim 13, wherein the sublist represents a collection of contestants in the list, wherein the contestants are part of a common social network.

15. The method of claim 13, wherein the at least one of the voters is allowed only one opportunity to select a preferred contestant among the contestants in the subset of contestants from the list.

16. The method of claim 13, wherein the at least one of the voters is allowed only one opportunity to select a preferred contestant among the contestants in the subset of contestants from the sublist.

* * * * *